United States Patent Office 2,968,635
Patented Jan. 17, 1961

2,968,635

ACTIVATED ALUMINA AND THE USE THEREOF

William G. Nixon, Westchester, Ill., assignor, by mesne assignments, to Universal Oil Products Company, Des Plaines, Ill., a corporation of Delaware No Drawing. Filed Sept. 19, 1958, Ser. No. 761,949

3 Claims. (Cl. 252—466)

The present invention, in its broad terms, relates to processes for manufacturing refractory inorganic metal oxides; the invention is more specifically directed to an improvement in such processes, and particularly in those processes for manufacturing refractory inorganic oxides which comprise alumina. The utilization of the method of the present invention results in an activated inorganic metal oxide highly desired for utilization either as catalytic material in and of itself, or as a carrier material for catalytically active metallic components. The inorganic oxide, prepared in accordance with the method of the present invention, is extremely suitable as an absorbing medium when employed as a desiccant or other suitable treating agent, or for use in processes for the physical separation of various organic compounds.

Refractory inorganic metal oxides are extensively employed throughout a wide variety of commercial industries; inorganic oxides are particularly utilized in the chemical and petroleum industries as carrier material for catalytic composites, or, in a few isolated instances, as a catalyst without the addition thereto of catalytically active metallic components. Inorganic metal oxides, including alumina, silica, magnesia, thoria, boria, titania, zirconia, etc., and mixtures thereof, are generally employed, without the addition thereto of catalytically active metallic components, as dehydrating, treating or purifying agents. The inherently high degree of porosity, possessed by these refractory inorganic oxides (which have been enumerated for the purpose of illustration), is one of the more prominent factors affecting their widespread use in removing solid contaminants from liquid and gaseous streams, liquid contaminants from gaseous and/or liquid streams, etc. The refractory metal oxides most frequently employed, for their unusually high adsorptive capacity, are alumina and silica, and mixtures thereof. The addition of other refractory inorganic oxides such as magnesia, thoria, boria, zirconia, titania, etc. is usually effected during processes for manufacturing catalytic composites for the purpose of imparting thereto certain physical characteristics, which in turn induce desired effects upon the reactions to be promoted.

The object of the present invention is to produce a refractory inorganic metal oxide, particularly alumina and/or silica, having an exceptionally high adsorptive capacity while serving either as a carrier material for other catalytically active components, or as a treating or purifying agent, or desiccant.

In one embodiment, the present invention provides an improvement in processes for manufacturing a refractory inorganic metal oxide, which improvement comprises contacting the inorganic metal oxide at a temperature in excess of 25° C. with gaseous ammonia.

In another embodiment, the present invention relates to an improvement in those processes for manufacturing refractory inorganic oxides wherein the inorganic metal oxide is subjected to high-temperature calcination in the presence of a free oxygen-containing gaseous material, which improvement comprises causing the metal oxide to contact, at a temperature in excess of 25° C., with gaseous ammonia, in the absence of said free oxygen-containing gaseous material.

In still another embodiment, the present invention provides a method for manufacturing a noble metal-containing catalyst which comprises preparing a refractory inorganic metal oxide, contacting said metal oxide, at a temperature within the range of from about 100° C. to about 600° C., with gaseous ammonia, thereafter calcining said ammonia-treated metal oxide in the presence of a free oxygen-containing gaseous material and subsequently impregnating the calcined metal oxide with the catalytically active noble metal component.

Specifically, the present invention provides a method for manufacturing a catalytic composite consisting of alumina and platinum, which method comprises contacting alumina, at a temperature within the range of from about 100° C. to about 600° C., with gaseous ammonia, thereafter calcining said alumina in the presence of a free oxygen-containing gaseous material and subsequently impregnating the calcined alumina with platinum.

Although the method of the present invention is applicable to the manufacture of a multitude of refractory inorganic oxides, hereinbefore set forth, in the interest of brevity, and for the purposes of illustrating the present invention, the following will be limited to the manufacture of alumina, alumina when utilized with other of the refractory inorganic metal oxides, or alumina when employed as a carrier material in manufacturing catalytically active composites. It is understood, however, that it is not intended to limit unduly the present invention beyond the scope and spirit of the appended claims. It is further understood that the method of the present invention may be utilized to advantage in the preparation of refractory inorganic metal oxides possessing high adsorptive capacity, whether alumina, alumina-silica, silica, and other refractory inorganic oxides either alone or in a particular combination with the alumina and/or silica.

In the specification and the appended claims, the term "alumina" is employed to mean aluminum oxide in all states of oxidation and all states of hydration, as well as aluminum hydroxide. The alumina to be treated, in accordance with the present invention, may be synthetically prepared or naturally occurring, and may be either of the crystalline, or the gel type. Alumina exists in a variety of physical modifications, which modifications are known as alpha-alumina, gamma-alumina, epsilon-alumina, etc., and which are either of the mono- or trihydrate form. The various forms of alumina are known by many trivial and trade names such as Gibbsite, Boehmite, Bayerite, and Diaspore, and it is intended to include all such forms.

The alumina, to be improved through the application of the method of the present invention, may be manufactured through the utilization of any of the well-known methods of manufacture. Alumina may be prepared, for example, by adding a suitable alkaline reagent such as ammonium hydroxide to a salt of aluminum metal, such as the chloride, the sulfate, the carbonate, etc., in an amount to form aluminum hydroxide which, upon drying, is converted to alumina. Other refractory inorganic oxides, particularly silica, may be added to the alumina through any convenient means including separate, successive or co-precipitation means. A preferred form of alumina is the sphere, and alumina spheres may be continuously manufactured by passing droplets of an alumina hydrosol into an oil bath maintained at an elevated temperature, retaining the droplets within said oil bath until they set to firm hydrogel spheroids. The hydrogel spheroids are continuously withdrawn from the oil bath, and immediately thereafter subjected to specific aging treatments for the purpose of imparting thereto certain desired physical characteristics. The alumina, which may be treated to improve its surface-area characteristics, may exist in any form such as spheres, above described, pills, granules, cakes, powder, extrudates, etc. It is not essential to the method of the present invention that the alumina be prepared in any particular manner or exist in any special physical form; the methods hereinabove set forth are intended to be illustrative rather than restrictive upon the present invention.

When utilized as a carrier material for catalysts containing one or more catalytically active metallic components, the refractory inorganic oxide, and particularly alumina, prepared in accordance with the present invention, will yield a more active catalyst than has been heretofore obtained. In addition, the catalyst will indicate a greater degree of stability, or the capability of performing acceptably, its intended function for an extended period of time. This increased activity and stability appears to be due to the increased surface area, and the accompanying decreased pore diameter, of the inorganic oxide. Whatever catalytically active metal components are combined therewith, the resulting composite is a more homogeneous material, and one in which the active metallic components are more thoroughly integrated throughout the entire structure of the inorganic oxide particles.

The refractory inorganic oxide, prepared in accordance with the embodiments of the present invention, is especially suited for use as the carrier material in the manufacture of catalysts employed in the reforming of hydrocarbons, although, as hereinbefore set forth, the use of a catalyst containing an inorganic oxide prepared through the utilization of gaseous ammonia is not limited to the manufatcure of such catalysts. The method of the present invention will produce a catalyst possessing a greater degree of cativity and stability, regardless of the industry in which such catalyst is ultimately employed.

Although the method of the present invention is particularly advantageous when utilized in manufacturing catalysts for the purpose of effecting the reforming of hydrocarbons, which catalysts generally contain a platinum component and a combined halogen component, other catalytic composites comprising a wide variety of metallic components may be advantageously affected. Catalytic composites which can be manufactured to possess a high degree of activity and stability, through the utilization of gaseous ammonia, comprise active metal components such as iridium, palladium, ruthenium, rhodium, vanadium, chromium, cobalt, copper, molybdenum, nickel, other metals of group VI and VIII of the periodic table, mixtures of two or more, etc. The metallic component may exist either as the element, or in combination as the halide, oxide, sulfide, sulfate, etc. It is understood that the benefits afforded catalytic composites containing different active metal components are not equivalent, and that the effects of employing the method of the present invention in conjunction with a particular catalytic composite are not necessarily the same effects observed with other catalysts. It is further understood that the method of the present invention is not unduly restricted to the manufacture of refractory inorganic oxides for use as carrier materials in the subsequent manufacture of catalytic composites. The essential feature of the present invention is the utilization of gaseous ammonia in the process of manufacturing the refractory inorganic oxide; the ultimate use, for which the inorganic oxide is intended, is not intended to be a limitation upon the present invention.

The exact nature of the phenomenon, effected through the action of gaseous ammonia, creating the significant change in the surface-area characteristics of the inorganic oxide is not known precisely. It has been shown, as hereinafter set forth, that the treatment with gaseous ammonia yields a refractory inorganic oxide with improved surface-area characteristics, whether the inorganic oxide is first prepared by a suitable, well-known method and subsequently treated with gaseous ammonia, or the ammonia treatment is made an intergral portion of such method. Preferably, the inorganic oxide is contacted, in accordance with the method of the present invention, with gaseous ammonia prior to subjecting the inorganic oxide to a high-temperature calcination treatment in an atmosphere of air. Most of the methods of manufacture presently employed, yield a refractory oxide which is substantially saturated with water. The oxide is necessarily dried, at temperatures within the range of about 100° C. to about 200° C. and calcined in the presence of air at substantially higher temperatures. The preferred method of the present invention is to cause the wet refractory material to contact with the gaseous ammonia, and, following a brief purge with nitrogen to remove traces thereof, to subject the oxide to a high-temperature calcination treatment. The length of the treatment with gaseous ammonia, as well as the concentration, or total amount, of ammonia passing through the refractory material would be deepndent upon the quantity of material to be so treated, the amount of water, both free and combined, contained within the refractory material, the means employed to disperse the gaseous ammonia throughout the refractory material, etc. The determination of the quantity of ammonia ultimately employed in a given instance, can be carried out readily by one skilled in the art, when the considerations above set forth are taken into account. It appears that there exists a finite stage, during the treatment with gaseous ammonia, at which the maximum change in surface-area characteristics has taken place. Any further treatment with ammonia would be uneconomical, and no advantage in utilizing an excess thereof appears to be foreseeable. The ammonia treatment has apparently attained its maximum effectiveness when the refractory material through which it is being dispersed has become substantially free of water.

The following examples are given for the purpose of illustrating further the method of the present invention, and to indicate more fully the benefits to be derived through the utilization thereof. It is not intended to limit unduly the scope of the present invention to the particular reagents, processing conditions and/or concentrations employed within the examples. Insignificant modifications, within the scope and spirit of the appended claims, will become readily apparent to those skilled in the art of manufacturing refractory inorganic oxide material, and particularly in the art of manufacturing alumina.

The alumina spheres employed in the examples were prepared from an alumina hydrosal containing combined chloride in an amount to yield an aluminum to chloride weight ratio of about 1.2:1. The hydrosol was formed into hydrogel spheroids in accordance with the oil-drop method hereinbefore set forth, which method is described in greater detail in U.S. Patent No. 2,620,314.

*Example I*

100 cubic centimeters of alumina spheres, prepared in accordance with the oil-drop method, were divided into the two portions of 50 cubic centimeters each. The first portion thereof was dried over a steam bath at a temperature of about 210° F., and thereafter placed in a glass furnace tube, being subjected therein to a high-temperature calcination, in an atmosphere of air, to a temperature of 500° C. The surface-area characteristics were determined as 201 square meters per gram, and a pore diameter of about 133 A. (as determined by the standard Brunaur, Emmett and Teller nitrogen adsorption method) for this calcined portion of alumina spheres.

*Example II*

The second 50 cubic centimeter portion of alumina spheres, formed from the alumina hydrosol hereinbefore described, which spheres, however, had neither been subjected to drying, nor to high-temperature calcination, were placed within a glass furnace tube at room temperature (approximately 80° F.). These wet, uncalcined alumina spheres were treated with a mixture of gaseous ammonia (50 cc. per minute) and nitrogen (300 cc. per minute), while the temperature was being increased to a level of 400° C. After a period of one hour, at which time the temperature attained the level of 400° C., the ammonia supply was shut off and the nitrogen employed as a purge for a period of about 5 minutes.

Following the brief purge with nitrogen, the ammonia-treated alumina spheres were subjected to high-temperature calcination at 500° C., in an atmosphere of air, for a period of two hours. Thereafter, the furnace tube was permitted to cool to room temperature, the spheres therein being removed and subjected to the Brunaur-Emmett-Teller analysis to determine the surface-area characterics thereof. The surface-area characteristics of the alumina spheres treated in accordance with the method of the present invention, indicated an area of 284 square meters per gram and a pore diameter of 110 A. This is equivalent to an increase in surface area of about 14%, and a decrease in pore diameter of about 17%. As hereinbefore set forth, alumina spheres having an increased surface area, coupled with a decrease in the pore diameter, are particularly well suited for utilization as the carrier material in the manufacture of catalytic composites containing active metallic components.

The foregoing examples indicate clearly the method of the present invention, and the benefits afforded through the utilization thereof. When the refractory inorganic oxide, prepared in accordance with the previously described method of the present invention, is ultimately employed in the manufacture of catalytic composites, it may be composited with the desired catalytic components immediately after the treatment with gaseous ammonia. That is, there need not necessarily be an intermediate step of air-oxidation, at elevated temperatures, prior to impregnating the refractory material with the catalytically active metallic components. Usually, however, the refractory material is not used immediately, but is stored temporarily prior to the impregnating procedure. In such instances, it is common practice to subject the inorganic oxide to a high-temperature calcination treatment, in the presence of air (or other free-oxygen containing gas media), for the purpose of insuring completely oxidized refractory material.

Similarly, following the impregnation of the inorganic oxide with the active metallic components, the catalytic composite is generally subjected to high-temperature calcination, in an atmosphere of air, to achieve substantially a completely oxidized composite. In any case, it is intended to be within the broad scope of the present invention, to prepare a refractory inorganic metal oxide, for ultimate utilization as a carrier material for catalytic composites, through the use of gaseous ammonia, either before, or after the inorganic oxide has been subjected to high-temperature calcination. It is further considered to be within the scope of the present invention to employ gaseous ammonia solely, or gaseous ammonia diluted with a suitable gaseous material. A suitable gaseous diluent would be any substance not having reactive propensities toward either the ammonia, the inorganic oxide, or the inorganic oxide impregnated with the catalytically active metallic components.

I claim as my invention:

1. A method of preparing alumina of improved surface-area characteristics which comprises contacting alumina hydrogel with gaseous ammonia at a temperature in excess of 25° C. and thereafter calcining the alumina.

2. A method of preparing alumina of improved surface-area characteristics which comprises contacting alumina hydrogel with gaseous ammonia at a temperature of from about 100° C. to about 600° C. and thereafter calcining the alumina.

3. A method for manufacturing an alumina hydrogel platinum catalyst which comprises preparing alumina hydrogel, contacting said alumina with gaseous ammonia at a temperature of from about 100° C. to about 600° C., removing said ammonia from the alumina and subjecting the latter to a calcining treatment at elevated temperatures, compositing platinum with said calcined alumina and thereafter drying and calcining the resulting alumina-platinum composite.

References Cited in the file of this patent

UNITED STATES PATENTS

| | | |
|---|---|---|
| 1,904,218 | Franceway | Apr. 18, 1933 |
| 2,287,022 | Burk | June 23, 1942 |
| 2,430,289 | Gary | Nov. 4, 1947 |